United States Patent [19]

Maehara

[11] Patent Number: 4,967,866
[45] Date of Patent: Nov. 6, 1990

[54] TRACTION CONTROL SYSTEM FOR MOTOR VEHICLES

[75] Inventor: Toshifumi Maehara, Ohsato, Japan

[73] Assignees: Akebono Brake Industry Co., Ltd.; Akebono Research and Development Centre Ltd., both of Japan

[21] Appl. No.: 341,536

[22] Filed: Apr. 21, 1989

[30] Foreign Application Priority Data

Apr. 28, 1988 [JP] Japan ................... 63-104022

[51] Int. Cl.$^5$ ............................................. B62K 31/00
[52] U.S. Cl. ............................... 180/197; 364/426.01; 303/97
[58] Field of Search ................... 180/197, 76; 364/426; 303/97, 105, 106, 109

[56] References Cited

U.S. PATENT DOCUMENTS 4,643,485 2/1987 Leiber ............................ 180/97 X Primary Examiner—Charles A. Marmor
Assistant Examiner—Alan M. Kagen

[57] ABSTRACT

In a traction control system for motor vehicles, the design is made such that during traction control operation, detection is made as to whether both the left-hand and the right-hand driving wheel speed have become equal to or higher than a predetermined threshold value, and detection is also made as to whether one of the driving wheel speeds which is increasing and the other one of the driving wheel speeds which is decreasing, have crossed each other; when the results of such detections are both "YES", this is regarded as an indication that a hunting phenomenon is likely to occur, and in response thereto, buildup and reduction of the brake hydraulic pressure is restricted; during the restriction, detection is made as to whether both of the driving wheel speeds have become equal to or lower than the predetermined threshold value, the above-mentioned restriction is removed. In this way, occurrence of a hunting phenomenon is restrained so that the difference between the left-hand and right-hand driving wheel speeds is decreased, thus preventing occurrence of vehicle body vibration.

6 Claims, 7 Drawing Sheets

BRAKE FLUID PRESSURE CONTROL ROUTINE

ANTI-HUNTING CONTROL ROUTINE

TRACTION CONTROL SYSTEM FOR MOTOR VEHICLES

BACKGROUND OF THE INVENTION

1. Field of the Invention

The present invention relates to a traction control system for motor vehicles, and more particularly it pertains to such a system wherein a slip of driving wheels which tends to be caused when the motor vehicle starts or accelerates is detected to control the braking of the driving wheels, thereby restraining the slip of the driving wheels.

2. Description of the Prior Art

Known in the art is a traction control system for motor vehicles, which is arranged, when the motor vehicle runs on a low-friction road surface such as a frozen, snow-covered or muddy one, to restrain a slip of driving wheel which tends to be caused in an attempt to start or accelerate the motor vehicle, thereby enhancing the starting/accelerating performance as well as the running stability of the vehicle. With such a conventional traction control system, it has been the usual practice that a slip of each of the left-hand and right-hand driving wheel is detected; and when the extent of the slip exceeds a predetermined value, a brake hydraulic pressure applied to a brake device for each driving wheel is increased so that the braking of the driving wheels is controlled, while at the same time the engine output is also controlled, as disclosed in Japanese Patent "Kokai" (Laid-opened) Publication No. 61-85248.

To control the brake hydraulic pressure to be applied to the driving wheels, the following procedures are commonly performed: A plurality of threshold levels are set up in relation to the vehicle speed so that a plurality of driving wheel speed ranges are established between adjacent ones of the aforementioned threshold levels; detection is made as to which speed range the current driving wheel speed belongs to, and detection is also made as to whether such driving wheel speed is increasing or decreasing; and buildup, reduction and holding of the brake hydraulic pressure for the driving wheels are controlled on the basis of such detections.

Since the left-hand and right-hand driving wheels are associated with each other through a differential gear, however, with such a conventional control system that the brake hydraulic pressure is increased or reduced in dependence on the aforementioned behavior of the driving wheels, there is a tendency that there occurs such a hunting phenomenon that if one of the driving wheels is rapidly decelerated by being braked, then the other driving wheel is rapidly accelerated so that a great speed difference is repeatedly caused to occur between the left-hand and right-hand driving wheels during a short period of time, thus causing the vehicle body to be vibrated.

SUMMARY OF THE INVENTION

Accordingly, it is an object of the present invention to provide a traction control system for motor vehicles, which is so designed as to prevent occurrence of vehicle body vibration which tends to be caused due to such a hunting phenomenon as mentioned above, during traction control operation.

Briefly stated, according to the present invention, during traction control operation, detection is made as to whether both the left-hand and the right-hand driving wheel speed have become equal to or higher than a predetermined threshold value, and detection is also made as to whether one of the driving wheel speeds which is increasing and the other of the driving wheel speeds which is decreasing, have crossed each other; when the results of such detections are both "YES", this is regarded as an indication that a hunting phenomenon is likely to occur, and in response thereto, buildup and reduction of the brake hydraulic pressure is restricted; during the restriction, detection is made as to whether both of the driving wheel speeds have become equal to or lower than the predetermined threshold value, the above-mentioned restriction is removed. In this way, occurrence of a hunting phenomenon is restrained so that the difference between the left-hand and right-hand driving wheel speeds is decreased, thus preventing occurrence of vehicle body vibration.

Other objects, features and advantages of the present invention will become apparent from the ensuing description taken in conjunction with the accompanying drawings.

DESCRIPTION OF THE PREFERRED EMBODIMENTS

Figure 1:
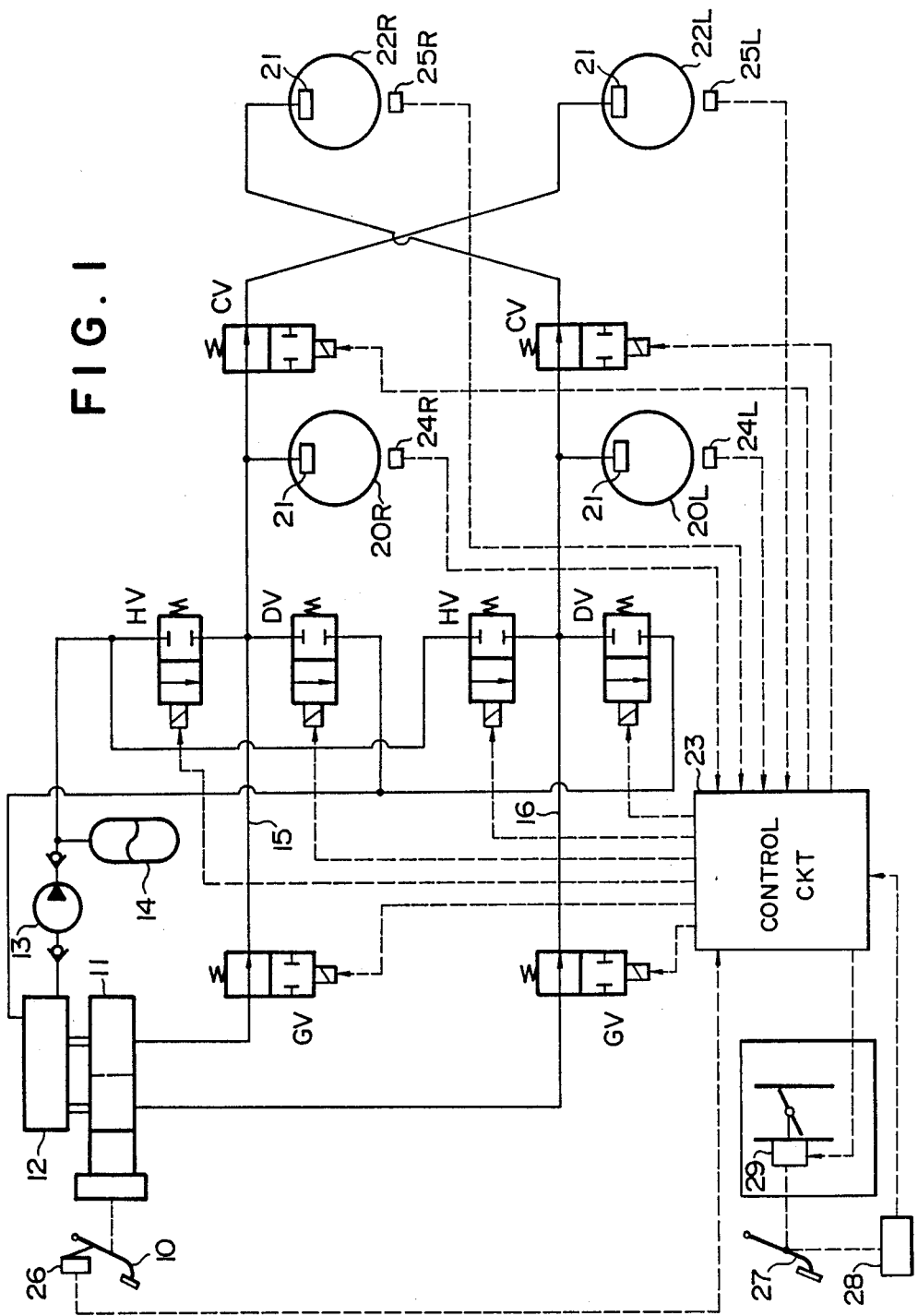
FIG. 1 is schematic view illustrating the traction control system according to an embodiment of the present invention.

Referring to FIG. 1, there is shown a systematic diagram of the traction control system according to an embodiment of the present invention, wherein a master cylinder 11 including two pressure chambers (not shown) is actuated through a brake pedal 10 serving as a brake operating member; brake fluid is pumped up by means of a pump 13 from a reservoir 12 attached to an upper portion of the master cylinder 11 and stored in an accumulator under a highly-pressurized condition.

One of the pressure chambers of the master cylinder 11 is connected to a wheel cylinder 21 of a brake device for braking a right-hand front wheel 20R (driving wheel) through a fluid passage 15 which is provided with a gate valve GV and connected to a wheel cylinder 21 of a brake device for braking a left-hand rear wheel 22L (non-driving wheel) through a cut valve CV. The other pressure chamber of the master cylinder 11 is connected to a wheel cylinder of a brake device for braking a left-hand front wheel 20L (driving wheel) through a fluid passage 16 which is provided with a gate valve GV and connected to a wheel cylinder 21 of a brake device for braking a right-hand rear wheel 22R (non-driving wheel) through a cut valve CV. Hold valves HV are connected between the fluid passage 15 and accumulator 14, and between the fluid passage 16 and the accumulator 14. Decay valves DV are connected between the fluid passage 15 and the reservoir 12, and between the fluid passage 16 and the reservoir 12. The highly pressurized brake fluid accumulated in the accumulator 14 is supplied to or interrupted from the wheel cylinders through the opening/closing operation of the respective hold valves HV. The brake fluid contained in the wheel cylinders 21 is discharged to or interrupted from the reservoir 12 through the opening/closing operation of the decay valves DV.

The gate valves GV, cut valves CV, hold valves HV and decay valves DV may comprise solenoid valves and are also used to effect antilock control when the motor vehicle is braked, and the opening/closing operations of these valves are controlled in accordance with commands from a microcomputer-based control circuit 23. When the traction control is commenced with respect to the left-hand and right-hand driving wheels 20L and 20R, the gate valves GV and cut valves CV are closed; the wheel cylinders 21 for the driving wheels 20L and 20R are separated from the master cylinder 11; and the wheel cylinders 21 for the non-driving wheels 22L and 22R are separated from the fluid passages 15 and 16. When the gate valves GV and cut valves CV are closed, the wheel cylinders for the non-driving wheels 22L and 22R are held in such a state that no brake fluid pressure is applied thereto. The brake fluid pressure in the wheel cylinders 21 for the driving wheels 20L and 20R are increased when the hold valves HV are opened and the decay valves DV are closed; it is held when the hold valves HV and decay valves DV are closed; and it is reduced when the hold valves HV are closed and the decay valves are opened.

Connected to the control circuit 23 are wheel speed sensors 24L, 24R, 25L and 25R for detecting the speeds of the wheels 20L, 20R, 22L and 22R; a brake switch 26 for detecting depression of brake pedal 10; and a sensor 28 for detecting the extent of depression of an accelerator pedal 27. The control circuit 23 controls the engine output by driving a throttle control mechanism 29 of the engine in response to information derived from these sensors, while at the same time controlling the brake fluid pressure in the wheel cylinders 21 for the driving wheels 20L and 20R by causing the gate valves GV, cut valves CV, hold valves HV and decay valves DV to be opened and closed. When the brake switch 26 is operated, the traction control is ended immediately.

Figure 2:
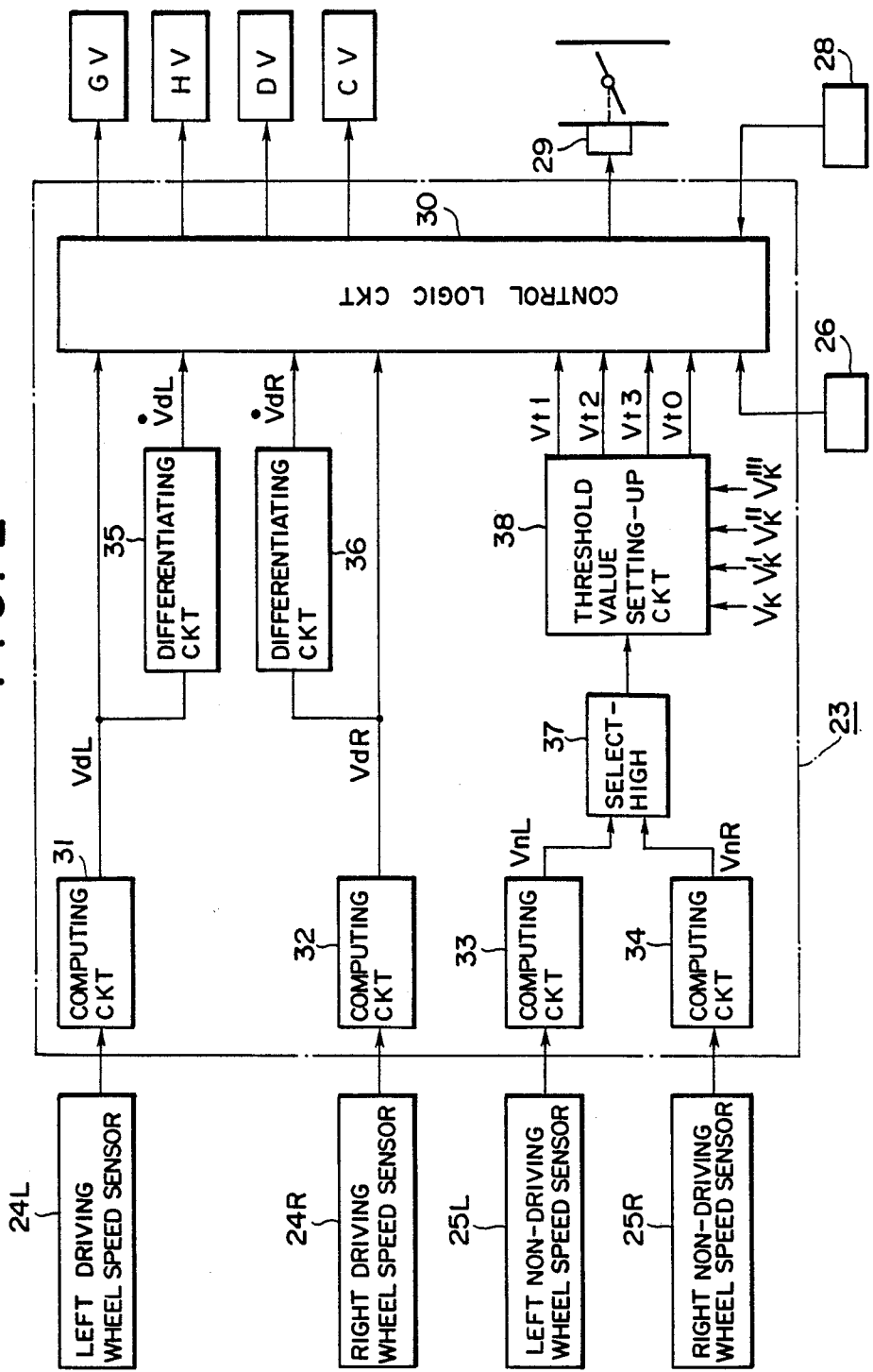
FIG. 2 is a block diagram illustrating the arrangement of control circuit incorporated in the system of FIG. 1.
Figure 3:
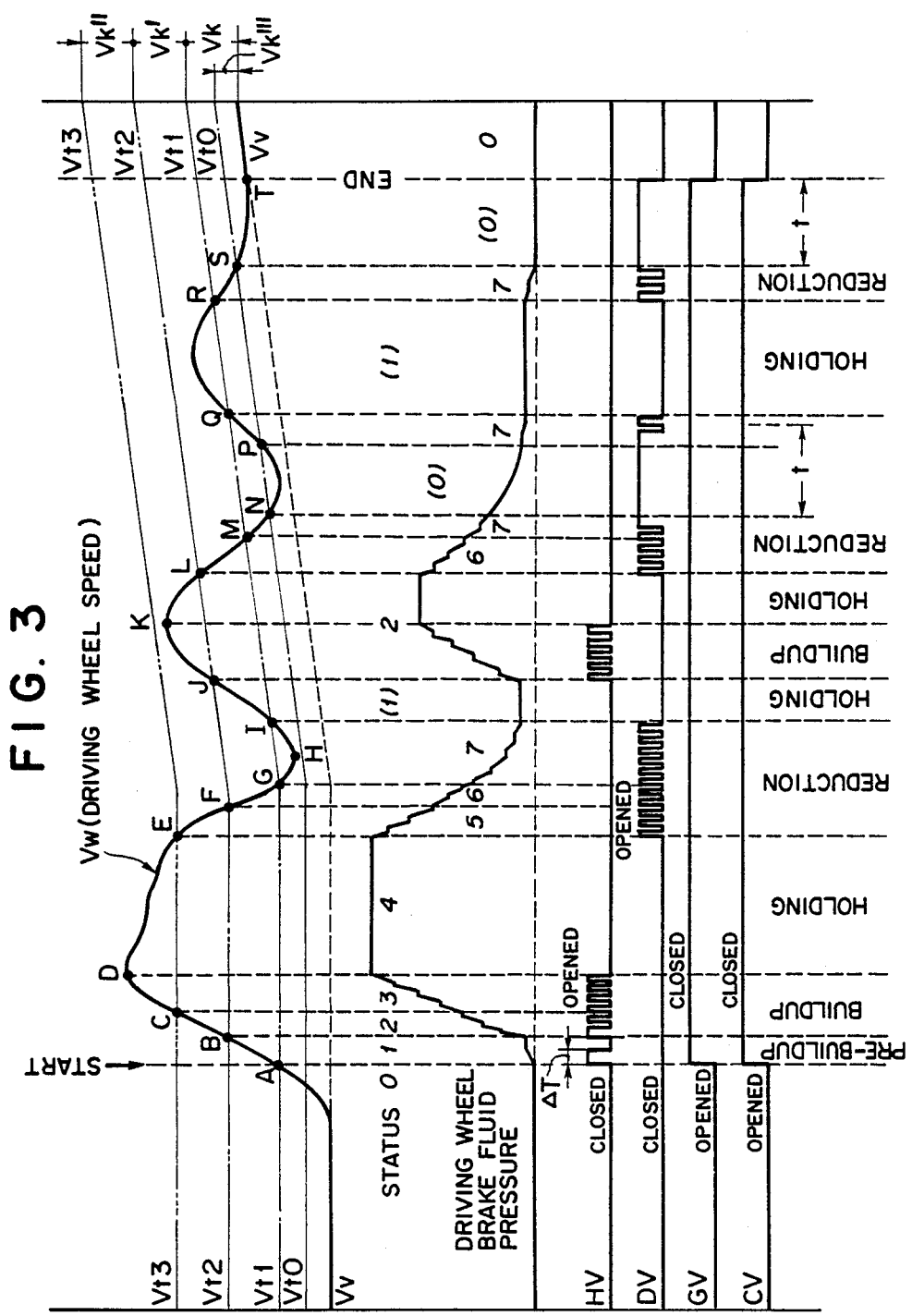
FIGS. 3 and 4 show timing charts for brake hydraulic pressure control.
Figure 4:
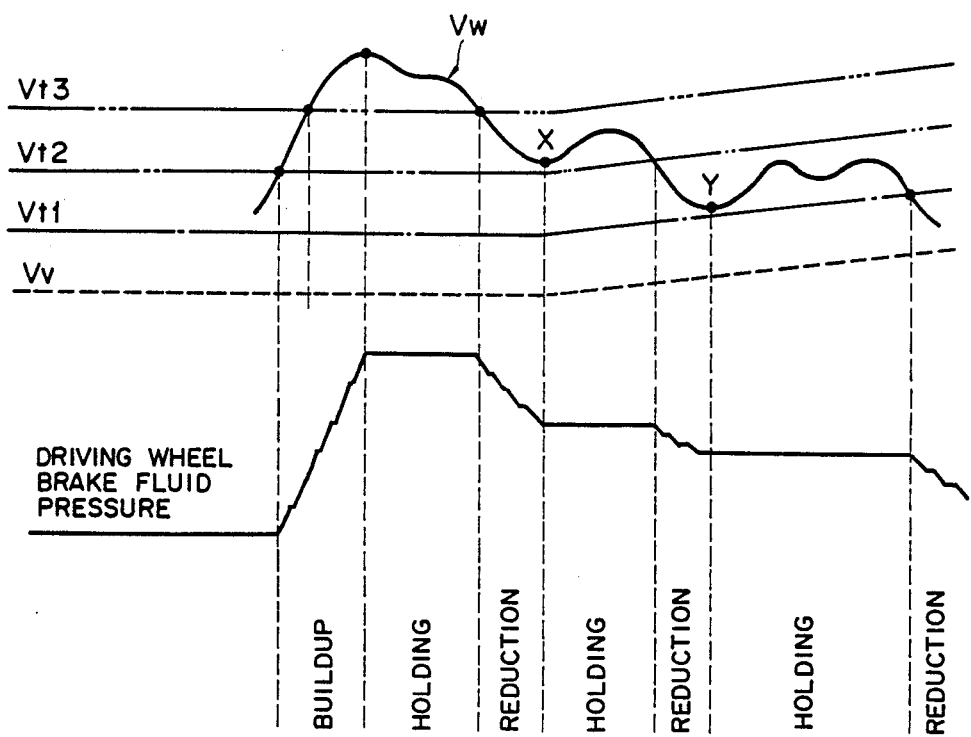

FIG. 2 shows the construction of the control circuit 23, and FIGS. 3 and 4 show the timing charts for the traction control executed by the control circuit 23. The speeds of the driving wheels 20L and 20R are detected by wheel speed sensors 24L and 24R respectively, and driving wheel speeds VdL and VdR are computed in computing circuits 31 and 32. The wheel speeds VdL and VdR are inputted to a control logic circuit 30. The speeds of the left-hand and right-hand non-driving wheels 22L and 22R are detected by wheel speed sensors 25L and 25R respectively, and left-hand and right-hand non-driving wheel speeds VnL and VnR are computed in computing circuits 33 and 34 respectively. The left-hand and right-hand driving wheel speeds VdL and VdR are passed to computing circuits 35 and 36 respectively so that the acceleration/deceleration dVdL/dt and dVdR/dt of the wheel speeds VdL and VdR are inputted to the control logic circuit 30.

The speeds VnL and VnR of the left-hand and right-hand non-driving wheels 22L and 22R are provided to a select-high circuit 37 so that the higher one of the wheel speeds VnL and VnR is selected and computed to provide a computed vehicle speed Vv which is approximate to the real vehicle speed; and the computed vehicle speed Vv is provided to an adding circuit 38 in which a first predetermined value Vk is added to the computed vehicle speed Vv to provide a first threshold value Vt1 ($=Vv+Vk$) as shown in FIG. 3; a second predetermined value Vk' is added to the first threshold value Vt1 to provide a second threshold value Vt2 ($=Vv+Vk+Vk'$); and a third predetermined value Vk" is added to the second threshold value Vt2 to provide a third threshold value Vt3 ($=Vv+Vk+Vk'+Vk"$). Further, another threshold value Vt0, which serves as control ending threshold, is established between the computed vehicle speed Vv and the first threshold value Vt1 by adding a fourth predetermined value Vk''' to Vv ($Vt/=Vv+Vk'''$). The threshold values Vt0 to Vt3 are inputted to the control logic circuit 30. In response to the various signals mentioned above, the control circuit 23 drives a throttle control mechanism 29 to control the throttle opening degree when the motor vehicle starts or accelerates, while at the same time controlling the opening/closing operations of the hold valves HV, decay valves DV and so forth, thereby controlling the brake fluid pressure at wheel cylinders 21 for left-hand and right-hand driving wheels 20L and 20R so that traction control is performed as shown in FIG. 3.

Figure 5:
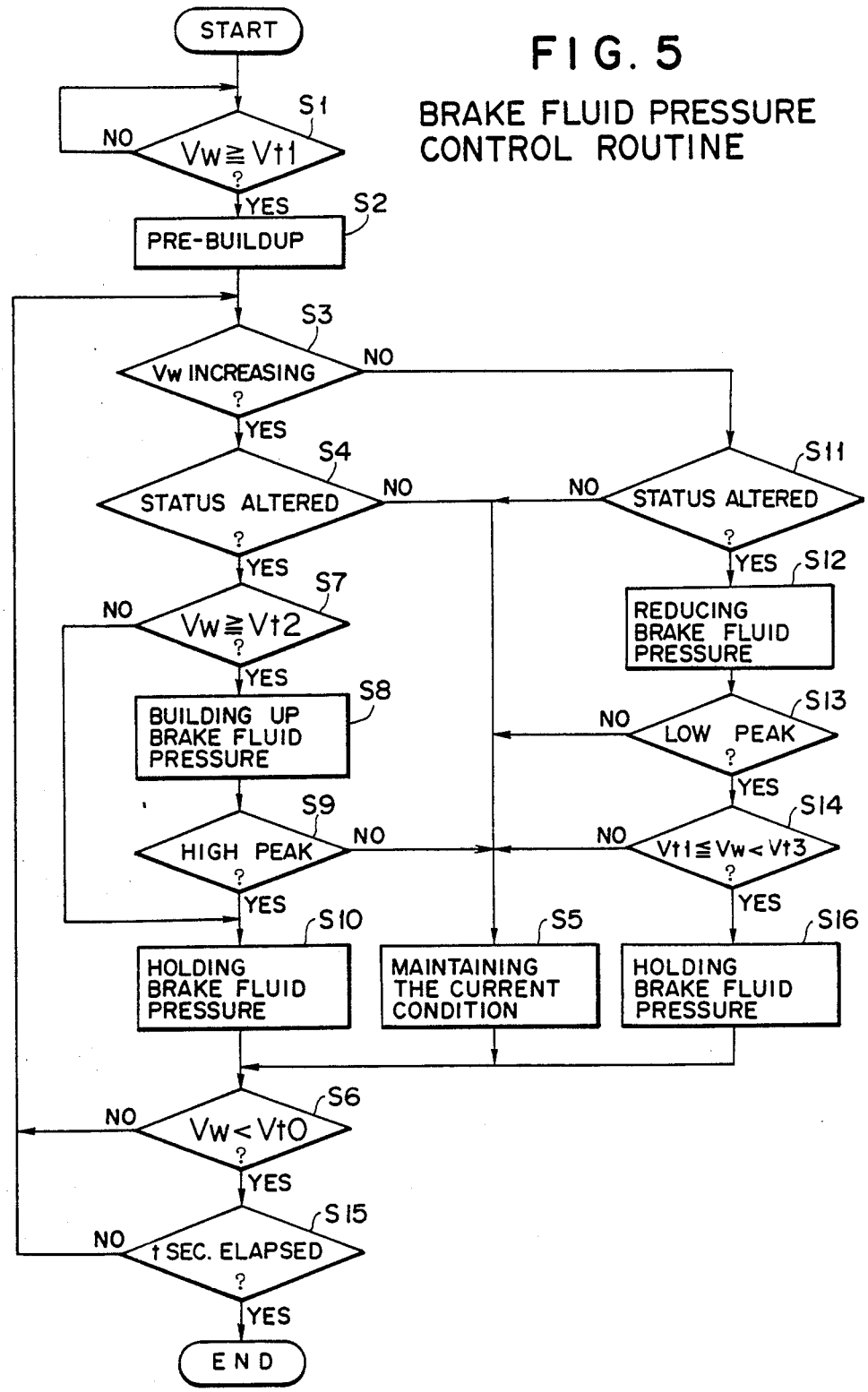
FIG. 5 shows a flow chart for brake hydraulic pressure control routine.

Description will now be made of an example of traction control system performed by the control circuit 23, by referring to FIGS. 3 and 4 showing timing charts for brake fluid pressure control at each status, and FIG. 5 showing a flow chart for control routine. In this example of traction control, brake fluid pressure control is effected independently with respect to the left-hand and right-hand driving wheels. In the ensuing explanation, any particular one of the left-hand and right-hand driving wheel speeds VdL and VdR is represented by Vw.

[STATUS 0]

This is status at which no traction control is effected. Before the control is started, the wheel speed Vw is lower than the first threshold value Vt1 (Vw<Vt1); and the control is started after a lapse of time period t from the time point when the wheel speed Vw becomes lower than the threshold value Vt0. In this case, both the hold valves HV and decay valves DV are closed; both the bate valves GV and cut valves CV are opened; and the brake fluid pressure is in a state of maximum reduction.

[STATUS 1: PRELIMINARY PRESSURE BUILDUP]

As the wheel speed Vw is increased, the result of judgment made at step S1 becomes "YES" at a time point A when the wheel speed Vw becomes equal to the first threshold value Vt1, and the process proceeds to step S1 so that control is started. At the time point A, the gate valves GV and cut valves CV are closed, and the hold valves HV are opened for a preset time T to effect preliminary buildup of the brake fluid pressure.

At the next step S3, judgment is made as to whether or not the wheel speed Vw is increasing. The status remains unchanged until the wheel speed Vw reaches the second threshold value Vt2. Thus, the process proceeds to step S5 while the condition at the status 1 is maintained. The process now proceeds to step S6. Such a procedure that the process proceeds to step S6 via the steps S4 and S5, is always repeated for each subsequent status. The step S6 constitutes one of the control ending conditions. In this case, since the condition that $Vw<Vt0$ is not prevailing, the process returns to the step S3 and proceeds to the step S4.

[STATUS 2: PRESSURE BUILDUP]

When the wheel speed Vw as increasing reaches the second threshold value Vt2 at a time point B, the result of the judgment made at the step S4 becomes "YES", and needless to say, the result of judgment at step S7 ($Vw \geq Vt2$?) also becomes "YES"; thus the process proceeds to step S8 at which buildup of the brake fluid pressure is started. The hold valves HV are opened and closed with ON-OFF intervals which are preset in accordance with the acceleration dVw/dt which occurs when the wheel speed Vw becomes equal to the second threshold value Vt2 ($Vw=Vt2$), as a result of which the brake fluid pressure builds up step-wise.

[STATUS 3: PRESSURE BUILDUP]

The wheel speed Vw increases further, and reaches a third threshold value Vt3 at a time point C. At step S9, judgment is made as to whether or not a high peak of the wheel speed Vw is reached. In this case, the result of judgment at step S9 is "NO", and hence the process returns to the step S3 via the steps S5 and S6, and again to steps S8 via the steps S4 and S7, so that the pressure buildup continues. The hold valves HV are opened and closed with ON-OFF intervals which are set up in accordance with the acceleration dVw/dt which occurs when the wheel speed Vw becomes equal to the third threshold value ($Vw=Vt3$), so that the brake fluid pressure further builds up step-wise.

[STATUS 4: PRESSURE HOLDING]

At a time point D when a high peak of the wheel speed Vw is reached, the result of judgment at step S9 becomes "YES", and thus the process proceeds to step S10 where the hold valves HV are closed so that the brake fluid pressure prevailing at the time point D is held. The process returns to the step S3 via the step S6. At and after the time point D, the wheel speed Vw is changed from increase to decrease so that the result of judgment at the step S3 becomes "NO", and thus the process flow of FIG. 5 shifts to right-hand side step S11 where like at the steps S4, judgment is made as to whether or not the status has changed. Unless the status has changed, the process repeatedly takes the passage S5 - S6 - S3.

[STATUS 5: PRESSURE REDUCTION]

When the wheel speed as decreasing becomes lower than the third threshold value Vt3 at a time point E, the result of judgment at step S11 becomes "YES", and thus the process proceeds to step S12 so that reduction of the brake fluid pressure is started. The decay valves DV are opened and closed with ON-OFF intervals which are preset in accordance with the deceleration dVw/dt which occurs when the wheel speed Vw becomes equal to the third threshold value Vt3 ($Vw=Vt3$), so that the brake fluid pressure is reduced step-wise. At the next step S13, judgment is made as to whether or not a low peak of the wheel speed Vw is reached. In this case, the result of judgment at step S13 is "NO", and thus the process proceeds to the step S5 so that the reduction of the brake fluid pressure is continued.

[STATUS 6: PRESSURE REDUCTION]

The wheel speed Vw further drops, and reaches the second threshold value Vt2 at a time point F; thus the result of judgment at step S11 becomes "YES" again, and the process proceeds to step S12. The decay valves DV are opened and closed with ON-OFF intervals which are preset in accordance with the deceleration dVw/dt which occurs when the wheel speed Vw becomes equal to the second threshold value Vt2 ($Vw=Vt2$), so that the brake fluid pressure is further reduced.

[STATUS 7: PRESSURE REDUCTION]

The wheel speed Vw further decreases, and reaches the first threshold value Vt1 at a time point G; thus the result of judgment at step S11 becomes "YES" again, and the process proceeds to step S12. The decay valves are opened and closed with ON-OFF intervals which are preset in accordance with the deceleration dVw/dt which occurs when the wheel speed Vw becomes equal to the first threshold value Vt1 ($Vw=Vt1$), so that the brake fluid pressure is further reduced. A low peak of the wheel speed Vw is reached at a time point H, and the result of judgment at step S13 becomes "YES"; thus the process proceeds to step S14 where judgment is made as to whether nor not the wheel speed Vw lies in the region between the first threshold value Vt1 and the third threshold value Vt3. In this case, since the wheel speed Vw is lower than the first threshold value Vt1 ($Vw<Vt1$), the result of judgment at step S14 is "NO". In this way, the reduction of the brake fluid pressure is further maintained so that the wheel speed Vw is changed from increase to decrease, and thus the control flow shifts to the step S4.

[STATUS (1): PRESSURE HOLDING]

If the wheel speed increases up to the first threshold value Vt1 at a time point I, then the result of judgment at the step S4 becomes "YES", and the process proceeds to the step S7. In this case, since the wheel speed Vw is lower than the second threshold value Vt2 ($Vw<Vt2$), the result of judgment at the step S7 is "NO" so that the process proceeds to step S10 and the brake fluid pressure prevailing at the time point I is held. This brake fluid pressure holding state is maintained until the status is changed. When the wheel speed Vw reaches the second threshold value Vt2, pressure buildup is started; and when the wheel speed Vw becomes lower than the first threshold value Vt1, pressure reduction is started.

[STATUS (0): PRESSURE REDUCTION]

In a manner similar to that mentioned above, at a time point J when the wheel speed Vw reaches the second threshold Vt2, pressure buildup is started; at a time point K when a high peak of the wheel speed Vw occurs, the brake fluid pressure is held; at a time point L when the wheel speed Vw drops down to the second threshold value Vt2, pressure reduction is started; at a time point M when the wheel speed further drops down to the first threshold value Vt1, status 7 occurs again. At a time point N, the wheel speed Vw reaches the control ending threshold value Vt0. At this point of time, the result of judgment at the step S6 becomes "YES" for the first time, and thus the process proceeds to step S15 where judgment is made as to whether or not preset time t in second has elapsed from the time point when the wheel speed Vw became lower than Vt0. The result of judgment at the step S15 is "NO" until the preset time t in second elapses from the time point N, and the control process returns to step S3. The pressure reduction at th status (0) is effected with the decay valves being closed.

At a time point Q when the wheel speed Vw becomes higher than the first threshold value Vt1, the status (1) occurs again wherein the brake fluid pressure is held. More specifically, at this status (1), the result of judgment at step S7 is "NO", and thus the process proceeds to step S10 so that the brake fluid pressure is held. Status 7 occurs at a time point R when the wheel speed Vw becomes lower than the first threshold value Vt1, so that the brake fluid pressure is reduced. At a time point S when the wheel speed Vw becomes lower than the control ending threshold value Vt0, the status (0) occurs again so that the result of judgment at the step S6 becomes "YES", and the process proceeds to step S15 where judgment is made as to whether or not the preset time t has elapsed. At a time point T when the preset time t elapses from the time point S, the result of judgment at step S15 becomes "YES" so that the control is ended, and the control process returns to the status 0, and the gate valves GV and cut valves CV are opened.

FIG. 4 shows the case where a low peak of the wheel speed Vw is decreasing is reached when the wheel speed Vw lies in the region between the first threshold value Vt1 and the third threshold value Vt3 while the brake fluid pressure is being reduced. In this case, the result of judgment at the step S16 where at time points X and Y when a low peak of the wheel speed Vw occurs, the brake fluid pressure is held. Such a state that the brake fluid pressure is held, is maintained until status change occurs, thus preventing occurrence of excessive pressure buildup or reduction. The control of the brake fluid pressure is effected in such a manner that at a time point when the wheel speed Vw as increasing becomes higher than the second threshold value Vt2 or third threshold value Vt3 for the first time, buildup of the brake fluid pressure is started and at a time point when the wheel speed Vw as decreasing becomes lower than the second threshold value Vt2 or first threshold value Vt1 for the first time, reduction of the brake fluid pressure is started.

Figure 6:
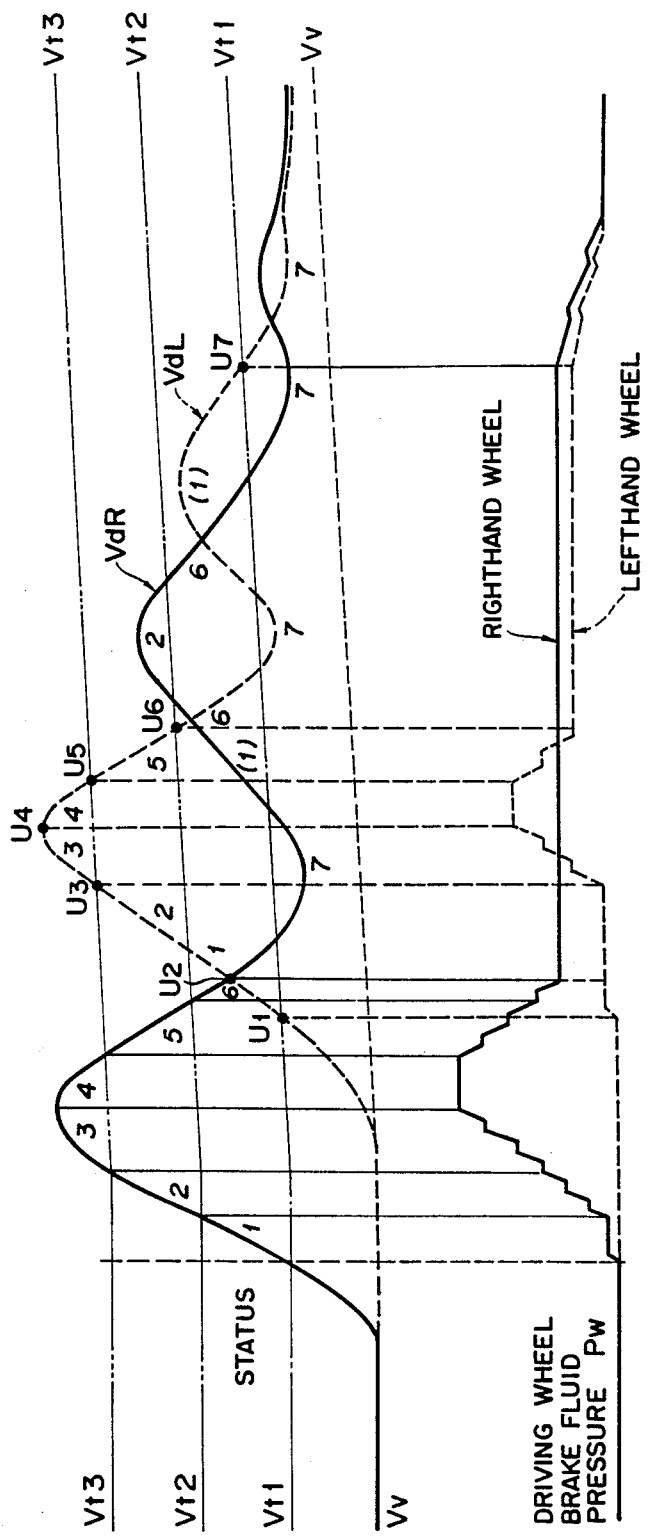
FIG. 6 shows a timing chart for brake hydraulic pressure control adapted to restrain occurrence of a hunting phenomenon.
Figure 7:
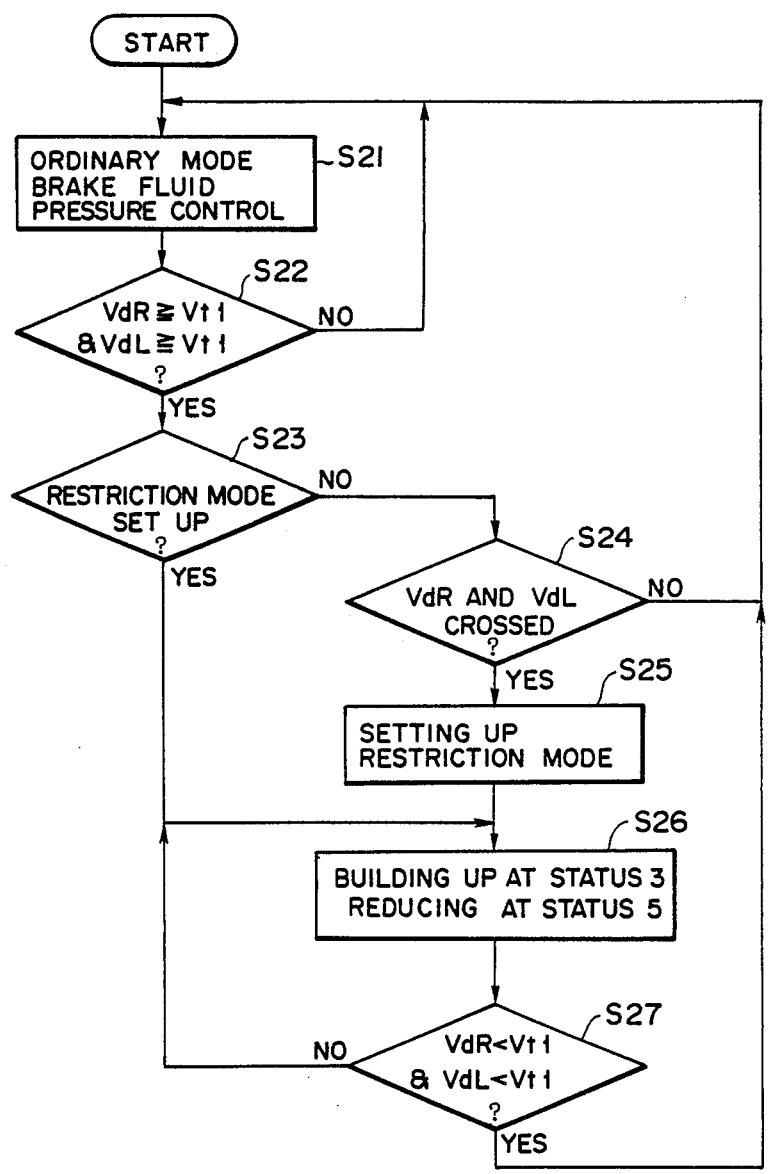
FIG. 7 shows a flow chart for anti-hunting control routine.

What has been mentioned above relates to an ordinary status control mode. According to the present invention, such control as illustrated in FIGS. 6 and 7 are also effected with a view to restraining occurrence of a hunting phenomenon. FIG. 6 is a timing chart illustrating an example that occurrence of a hunting phenomenon is restrained by controlling the brake fluid pressure for each of the left-hand and right-hand driving wheels, and FIG. 7 is a flow chart for anti-hunting control routine.

During the period from a time point when brake fluid pressure control in the ordinary mode is started (step S21) to a time point $U_1$, only the wheel speed VdR of the left-hand and right-hand driving wheel speeds VdL and VdR is higher than the first threshold value Vt1; thus the result of judgment made at step S22 as to whether or not both of the wheel speeds VdR and VdL are higher than the first threshold value Vt1, becomes "NO" so that the process returns to step S21 again and the control is performed in the ordinary status mode. From the time point $U_1$ onward, both the speed speeds VdR and VdL become higher than the first threshold value Vt1, and thus the result of judgment at step S22 becomes "YES" so that the process proceeds to step S23 where judgment is made as to whether or not a restriction mode for pressure buildup/reduction is set up. In this case, the result of judgment at step S23 is "NO", and thus the process proceeds to step S24 where judgment is made as to whether or not the wheel speeds VdR and VdL as increasing and decreasing or vice versa have crossed each other. When the wheel speeds VdR and VdL do not cross each other, the result of such judgment is "NO", so that the process returns to step S21 again. When a time point $U_2$ in FIG. 6 is reached, one of the wheel speeds, VdL, which is increasing, and the other one of the wheel speeds, VdR, which is decreasing, cross each other, and thus the result of judgment at step S24 becomes "YES" for the first time, so that the restriction mode for pressure buildup/reduction is set up (step S25). In this way, the brake fluid pressure is controlled in such a manner that pressure buildup is effected only at status 3 and pressure reduction is effected only at status 5.

In the ordinary status control mode, the brake fluid pressure is controlled such that preliminary pressure buildup is effected for the first cycle and the brake fluid pressure is held for the second and succeeding cycles; the brake fluid pressure is increased at status 2 and 3; the pressure is held at status 4; and the pressure is reduced at status 5, 6 and 7. When the restriction mode for pressure buildup/reduction is set up at step S25, the brake fluid pressure is controlled in such a manner as to be increased only at status 3, reduced only at status (step S26) and held at all the other status than the above. When both the wheel speeds VdR and VdL do not become lower than the first threshold value Vt1, the result of judgment at step S27 is "NO", the processing at step S26 is continued. At the time point $U_2$, the wheel speed VdR is at status 6, and the wheel speed VdL is at status 1; thus the control is effected so that the brake fluid pressure prevailing at the time point $U_2$ is held.

After the time point $U_2$, the result of judgment made at step S23 in FIG. 7 as to whether or not the restriction mode for pressure buildup/reduction becomes "YES", and thus the process proceeds directly to step S26 so that the brake fluid pressure prevailing at the time point $U_2$ is held with respect to both the wheel speeds VdR and VdL. With respect to the wheel speed VdL, at a time point $U_3$, status 3 occurs so that the brake fluid pressure is increased; at a time point $U_4$, the brake fluid pressure is held; at a time point $U_5$, status 5 occurs so that the brake fluid pressure is reduced; and from a time point $U_6$ onward, the brake fluid pressure is held.

In this way, both the wheel speeds VdR and VdL become lower than the threshold value Vt1 at a time point $U_7$ as a result of the above-mentioned control of the brake fluid pressure having been effected with respect to the left-hand and right-hand driving wheels 20L and 20R. Consequently, the result of judgment at step S27 in FIG. 7 becomes "YES", so that the process returns to step S21 and the brake fluid pressure control now is effected in the ordinary mode.

As will be appreciated from the foregoing discussion, according to the above-mentioned embodiment of this invention, when it is judged that both of the left-hand and right-hand driving wheel speeds VdR and VdL exceeds the first threshold value Vt1 and that one (VdL for example) of the driving wheel speeds, which is increasing, and the one (VdR for example) of the driving wheel speeds, which is decreasing, have crossed each other, brake fluid pressure buildup/reduction is restricted such that the wheel speeds VdR and VdL are increased only at status 3 and reduced at only status 5. In this way, occurrence of a hunting phenomenon is restrained so that the difference between the left-hand and right-hand driving wheel speeds is decreased to such an extent that occurrence of vehicle body vibration is prevented.

While the present invention has been illustrated and described with respect to some specific embodiments thereof, it is to be understood that the present invention is by no means limited thereto but encompasses all changes and modifications which will become possible within the scope of the appended claims.

What is claimed is:

1. A traction control system for motor vehicles, wherein a slip of a driving wheel which tends to occur when the motor vehicle starts or accelerates, is detected; and braking force imparted to said driving wheel is controlled on the basis of said detection, thereby restraining the slip of said driving wheel, said traction control system comprising:
   (a) wheel speed detecting means for detecting left-hand and right-hand driving wheel speeds;
   (b) threshold value setting-up means for setting up a predetermined threshold value in relation to the vehicle speed, said threshold value being higher than said vehicle speed; and
   (c) means for detecting that both of said left-hand and right-hand driving wheel speeds have become equal to or higher than said predetermined threshold value and that one of the driving wheel speeds, which is increasing, and the other one of said driving wheel speeds, which is decreasing, have passed each other, in the opposite direction said means being arranged, when said detection is made, to restrict buildup/reduction of the brake fluid pressure.

2. A traction control system according to claim 1, further comprising means for making judgment as to whether or not both the left-hand and right-hand driving wheel speeds become equal to or lower than said predetermined threshold value, said means being arranged, when said detection is made, to remove said restriction for buildup/reduction of the brake fluid pressure.

3. A traction control system according to claim 1, wherein the higher one of the left-hand and right-hand non-driving wheel speeds is selected as a computed vehicle speed; and a speed higher by a predetermined value than the computed vehicle speed is set as said threshold value.

4. A traction control system according to claim 1, wherein the higher one of the left-hand and right-hand non-driving wheel speeds is selected as a computed vehicle speed; and three different vehicle speeds are set as a first threshold value Vt1, second threshold value Vt2 and third threshold value Vt3 ($Vt1 < Vt2 < Vt3$); wherein status 1, status 2 and status 3 occur when the respective driving wheel speeds as increasing lie in a region between the first and second threshold values, in a region between the second and third threshold values, and in a region between above the third threshold value respectively; and status 4, status 5 and status 6 occur when the respective driving wheel speeds as decreasing lie in the region above the third threshold value, in the region between the third and second threshold values, and in the region between the second and first threshold values respectively; wherein when no restriction is laid upon buildup/reduction of the brake fluid pressure, the brake fluid pressure is increased at the status 2 and status 3, held at the status 4, and reduced at the status 5 and status 6; and wherein when restriction is laid upon buildup/reduction of the brake fluid pressure, the brake fluid pressure is increased only at the status 3, reduced only at the status 5, and held at the status 2, status 4 and status 6.

5. A traction control system according to claim 4, wherein in the case where no restriction is laid upon buildup/reduction of the brake fluid pressure, when during pressure reduction at the status 5, a low peak of the driving wheel speed is reached, the brake pressure is held until status change occurs.

6. A traction control system according to claim 4, wherein at the status 1 which occurs immediately after the traction control is started, preliminary pressure buildup is effected; and at status 1 which occurs subsequently, the brake fluid pressure is held.

* * * * *